(12) United States Patent
Boyer

(10) Patent No.: US 6,968,292 B2
(45) Date of Patent: Nov. 22, 2005

(54) INDUSTRIAL CONTROLLER EVENT LOGGING

(75) Inventor: Bradley R. Boyer, Clawson, MI (US)

(73) Assignee: Paragon Technical Services, Inc., Clawson, MI (US)

( * ) Notice: Subject to any disclaimer, the term of this patent is extended or adjusted under 35 U.S.C. 154(b) by 0 days.

(21) Appl. No.: 10/791,591

(22) Filed: Mar. 2, 2004

(65) Prior Publication Data

US 2005/0198034 A1 Sep. 8, 2005

(51) Int. Cl.$^7$ ............................................. G05B 19/00
(52) U.S. Cl. ..................... 702/182; 702/187; 702/188; 700/20
(58) Field of Search ............................. 702/182–189, 702/122, 113–115, 178; 700/11, 18, 9, 19, 700/23, 20, 73, 74; 709/224; 718/100; 714/47, 714/39; 711/100, 171; 710/54; 370/229, 370/231, 232; 707/3, 10

(56) References Cited

U.S. PATENT DOCUMENTS

| | | | | |
|---|---|---|---|---|
| 4,972,367 A | * | 11/1990 | Burke | 707/10 |
| 5,327,557 A | * | 7/1994 | Emmond | 707/3 |
| 5,485,620 A | | 1/1996 | Sadre et al. | 717/162 |
| 5,555,504 A | | 9/1996 | Lepper et al. | 700/115 |
| 5,594,889 A | * | 1/1997 | Colgate et al. | 711/171 |
| 5,771,374 A | | 6/1998 | Burshtein et al. | 713/502 |
| 5,850,066 A | | 12/1998 | Dew et al. | 219/109 |
| 5,923,132 A | | 7/1999 | Boyer | 318/34 |
| 5,963,003 A | | 10/1999 | Boyer | 318/574 |
| 6,061,603 A | | 5/2000 | Papadopoulos et al. | 700/83 |
| 6,169,928 B1 | | 1/2001 | Olson et al. | 700/7 |
| 6,411,987 B1 | | 6/2002 | Steger et al. | 709/203 |
| 6,505,247 B1 | | 1/2003 | Steger et al. | 709/224 |
| 2003/0120841 A1 | | 6/2003 | Chant et al. | 710/52 |
| 2003/0158795 A1 | | 8/2003 | Markham et al. | 705/28 |

* cited by examiner

Primary Examiner—Hal Wachsman
(74) Attorney, Agent, or Firm—Brooks Kushman P.C.

(57) ABSTRACT

Industrial equipment is monitored by at least one industrial controller assigned to each group of industrial equipment. Queues are established by logic within one of the industrial controllers for each group. Each queue holds a number of event records. Logic is established in each industrial controller for storing an indication of a detected event associated with a time stamp as an event record in a queue. A group computer is interconnected with each industrial controller in the group. A scan rate is established for each queue in that group. Event records are read from each queue based on the scan rate for that queue. The event records for all queues in a group are accumulated by the group computer and forwarded to a server. The group computer may dynamically set the scan rate and/or the queue length for each queue based on records read from the queue.

23 Claims, 6 Drawing Sheets

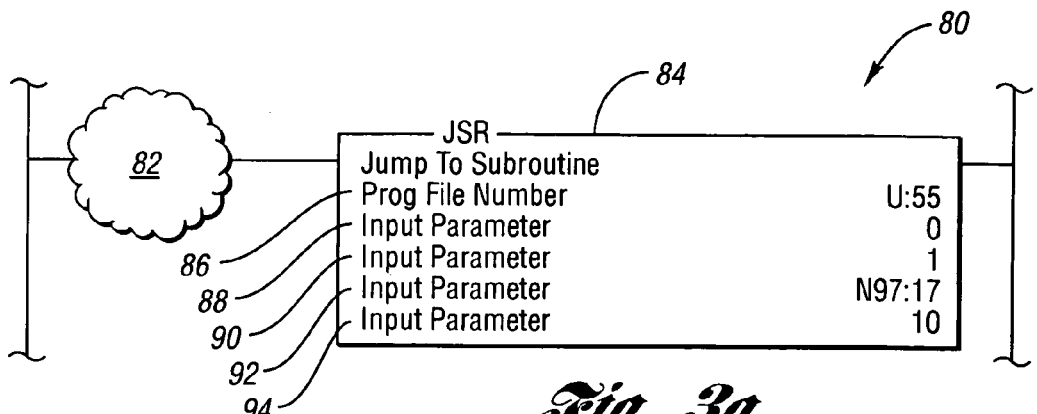
Fig. 3a
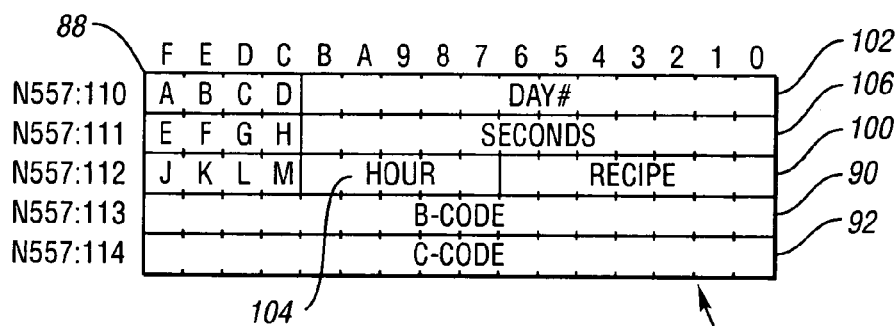
Fig. 3b
Fig. 3c
Fig. 3b

INDUSTRIAL CONTROLLER EVENT LOGGING

BACKGROUND OF THE INVENTION

1. Field of the Invention

The present invention relates to the use of industrial controllers for monitoring and reporting the status of industrial equipment.

2. Background Art

Industrial equipment is used to manufacture or process a wide variety of products, raw materials, intermediate components, and the like. Industrial equipment may also provide a variety of services such as cleaning, packaging, weighing, counting, forming, coating, and the like. Typically, industrial equipment is operated under the control of one or more industrial controllers. Industrial controllers allow the operation of the industrial equipment to be programmed by one or more of the equipment manufacturer, system integrator, plant engineer, and the like. Programmable industrial control can be implemented in special purpose hardware such as robotic controllers, proprietary processors, and the like. Industrial controls may also be implemented in more general hardware such as programmable logic controllers (PLC), personal computers, and the like.

Industrial controllers generate control signals based, in part, on detecting an event or state in the controlled machine. Typically, the industrial controller receives input from sensors monitoring the operation of the industrial equipment. In addition to generating control signals, industrial controllers have been programmed to display or output as data information about the condition of controlled equipment. Recently, central computer systems have been networked to industrial controllers for collecting status information. This information has been aggregated and displayed to provide an indication of plant-wide operations.

Several problems exist with current industrial control monitoring systems. First, each industrial controller is typically programmed with custom software for generating and transmitting status information. This software may take the form of an interrupt or other anomaly handling process which generates and transmits an event message when a specified event occurs. This typically requires that the industrial controller contain complex and individualized logic for anomaly handling.

A second problem with existing systems results from the unpredictable and uncontrolled nature of messages generated and transmitted by the industrial controllers. Each controller generates messages as the need arises. Hence, there is no centralized control of communication network resources. This may result in wasted network bandwidth and network clogging during critical situations.

Third, precise and accurate time stamping of status messages is often necessary to accurately determine the root cause of a manufacturing problem in a complex process including multiple pieces of manufacturing equipment. Systems that time stamp messages upon receipt at a centralized computer system or when the message is sent from the industrial controller create timing inaccuracies making accurate cause-and-effect analysis difficult.

Fourth, many industrial controllers have limited processing and memory resources. These limited resources prohibit the implementation of complex network signaling techniques.

What is needed is to log industrial equipment events in a manner which utilizes a low amount of system resources, is simple and robust, allows for a high degree of synchronization between industrial controllers, and has a high degree of uniformity amongst similar industrial controllers.

SUMMARY OF THE INVENTION

The present invention relates to establishing queues in industrial controllers for holding event records. The event records are retrieved from the queues based on scan rates established for each queue.

The present invention encompasses a manufacturing system including a plurality of industrial controllers each executing logic establishing at least one queue. Each industrial controller detects an event, associates a preassigned event code with the event, reads a time clock to obtain an event time and stores as an event record the preassigned event code associated with the event time in the queue. The system also includes a data communication network interconnecting the industrial controllers. A group computer is also connected to the data communication network. The group computer synchronizes the time clock in each industrial controller. For each queue in each industrial controller, the group computer stores a queue scan rate value and queue length value. For each queue, the group computer retrieves at least one of the event records held in the queue at a periodic interval based on the scan rate value. Event records retrieved from the industrial controllers are accumulated and periodically forwarded. A server receives the forwarded accumulated event records and stores the received records for access by user interface programs.

In an embodiment of the present invention, the group computer leaves each industrial controller in substantially the same state after retrieving event records from any queue maintained by the industrial controller. During each scan, the group computer obtains a copy of all event records held by the queue. The group computer compares a set of recently retrieved event records with a set of event records retrieved from at least one proceeding scan to determine if any duplicate event records were retrieved. The group computer may dynamically adjust the queue scan rate value and/or the queue length based on the comparison.

In another embodiment of the present invention, the queue is emptied by the operation of retrieving all event records held in that queue. In this case, each industrial controller stores a queue overflow event in the queue if the queue overflows. The group computer can then dynamically adjusts the queue scan rate value and/or the queue length based on the number of queue overflow events retrieved from the queue.

In a further embodiment of the present invention, logic establishing at least one queue is common to all industrial controllers of a similar type. Logic for detecting an event is unique to each industrial controller application.

A method for monitoring industrial equipment is also provided. The industrial equipment is divided into a plurality of groups with at least one industrial controller assigned to each group. Each industrial controller monitors conditions of industrial equipment assigned to the group. A plurality of queues is established for each group. Each queue holds a number of event records. Logic is established in each industrial controller to detect a predetermined event and store an indication of the detected event associated with a time stamp as an event record in a queue associated with the predetermined event. A data communication network interconnects a group computer with each industrial controller in the group. A scan rate is established in each group computer for each queue in that group. The event records in each queue are periodically read based on the scan rate for that queue. The event records for all queues in a group are accumulated in the group computer and then forwarded to a server. The accumulated event records for each group computer are collected in the server for access by user application programs.

A method of monitoring industrial equipment is also provided. One of a predetermined set of events is detected in the industrial equipment. An event record is formed by associating the detected event with a time stamp. The event record is pushed onto a finite length queue initiated within an industrial controller. All of the event records held by the queue are read after an interval determined by a scan rate. Any event record matching a previously read event record is discarded as a duplicate event record. The scan rate is dynamically determined based on whether or not any duplicate event records are discarded.

Another method of monitoring industrial equipment is provided. Event records are pushed onto a finite length queue initiated within an industrial controller. An overflow event is recorded onto the queue if an overflow event is detected. After an interval determined as a scan rate, all event records held by the queue are read and cleared. The scan rate is dynamically determined based on reading at least one overflow event.

A method of monitoring industrial equipment is also provided. A plurality of queues is established, each queue having its own scan rate. Each event is associated with an event label and one of the plurality of queues. When one of the events is detected, the event label associated with the detected event is stored together with a time stamp as an event record in the queue associated with the detected event. Each queue is periodically read at a rate determined by the scan rate for that queue. The event records from the plurality of queues are accumulated.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 3a–3d are schematic representations illustrating queue and record implementation according to an embodiment of the present invention;

DETAILED DESCRIPTION OF THE PREFERRED EMBODIMENT

Figure 1:
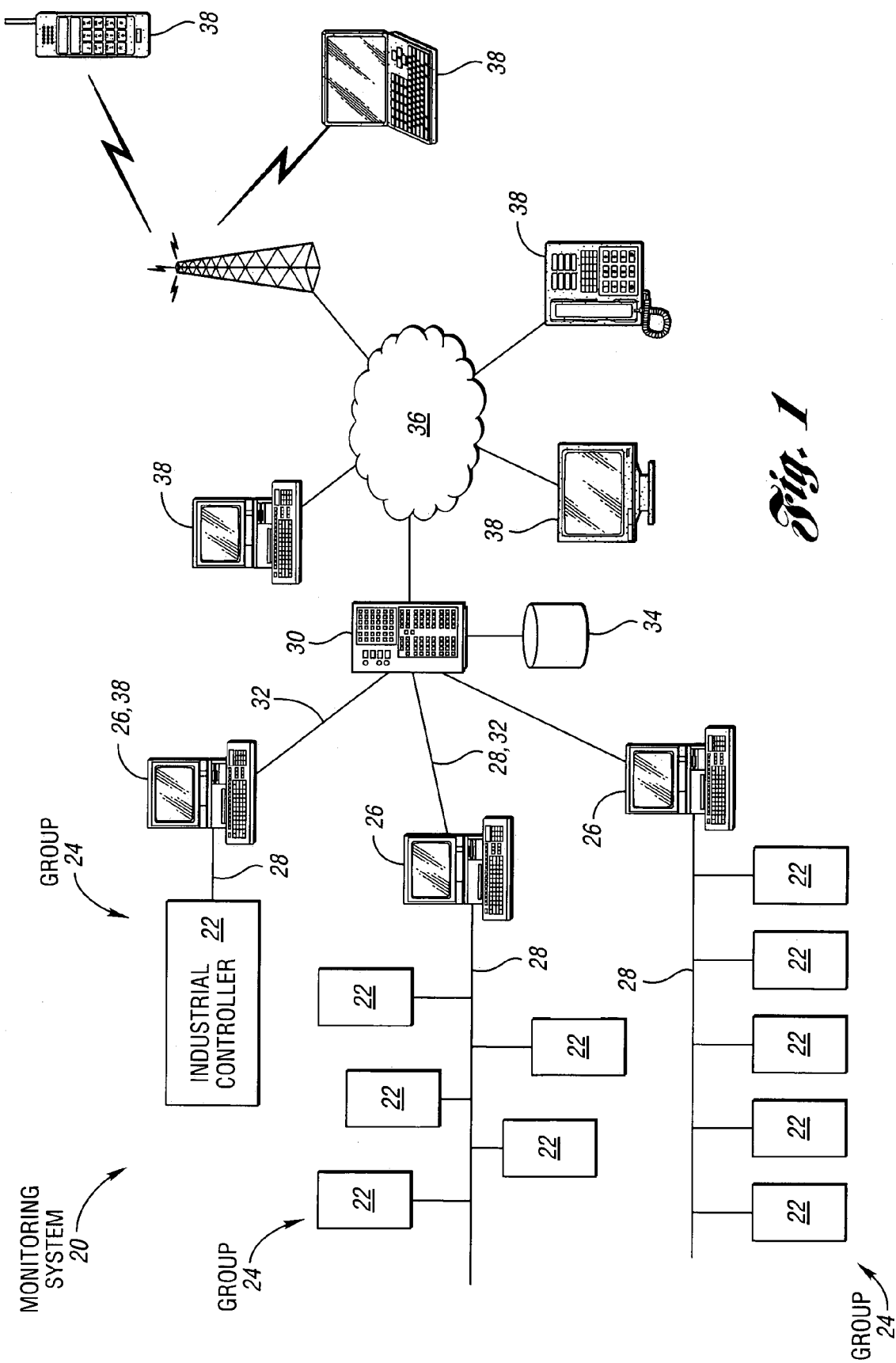
FIG. 1 is a block diagram illustrating a system for monitoring industrial equipment according to an embodiment of the present invention.

Referring to FIG. 1, a block diagram illustrating a system for monitoring industrial equipment according to an embodiment of the present invention is shown. A monitoring system, shown generally by 20, includes a plurality of industrial controllers 22. Industrial controller 22 may be any programmable device controlling the operation of industrial equipment. Types of industrial controllers include programmable logic controllers (PLCs), robotic controllers, personal computers, numerical logic controllers, special purpose hardware, dedicated processors, and the like. Industrial controllers 22 establish queues holding event records representing events occurring on monitored equipment.

Each industrial controller 22 is assigned to one group, shown generally by 24. Each group 24 also include group computer 26. Group computer 26 and industrial controllers 22 within each group 24 are connected through data communication network 28. Data communication network 28 may be any suitable data network including serial connections, Ethernet, DATA HIGHWAY PLUS™, CONTROLNET™, SERCOS (IEC 61491), and the like. Group computer 26 is preferably a personal computer but may also be implemented with a PLC, high-end server, custom processor, network controller, and the like. Group computer 26 scans queues in interconnected industrial controllers 22 based on a scan rate established for each queue. Each scan returns event records held within the scanned queue. The event records are accumulated within group computer 26.

Monitoring system 20 includes server 30 in communication with each group computer 26 through server-to-group computer link 32 such as, for example, an intra-plant local area network, data communication network 28, and the like.

Server 30 receives accumulated event records from group computers 26 and stores these event records in a manner accessible to users such as, for example, in database 34. Database 34 may include event record files arranged by periodic intervals, such as each shift, day, week, or the like. In addition or alternatively, database 34 may provide access to event records based on group, line, plant, machine type, part type, production run, recipe, event code, queue, and the like. Server 30 is connected to one or more user networks 36 permitting access to database 34 by various user devices 38. User network 36 may include one or more of an intra-plant local area network, a wide area network, a metropolitan area network, the Internet, wireless intra-plant or inter-plant networks, the telecommunication system, and the like. Various user devices 38 can include personal computers, dedicated display screens, wireline and wireless telephones, and the like. User devices 38 can run custom, off-the-shelf or hybrid information management programs.

Figure 2:
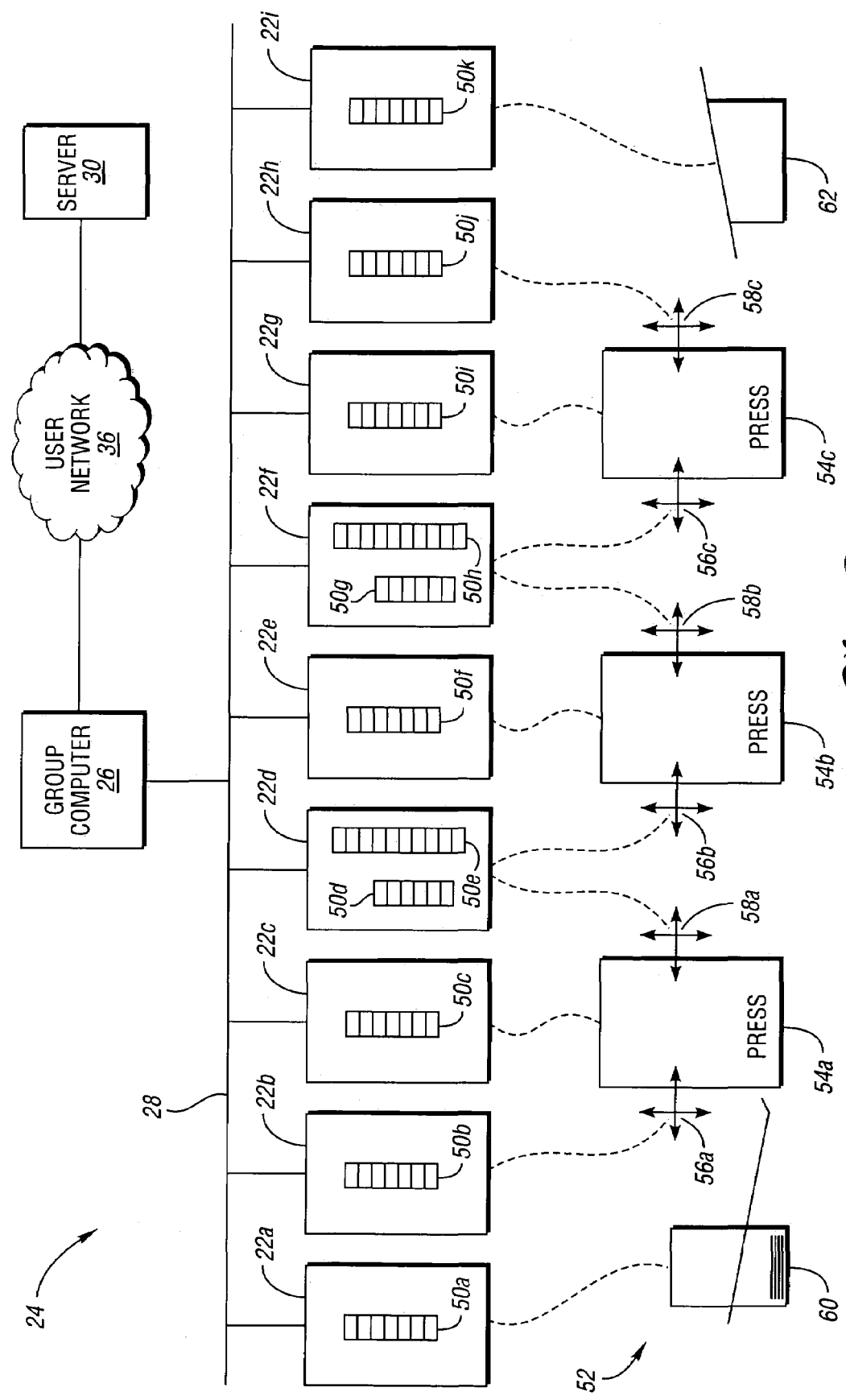
FIG. 2 is a schematic diagram illustrating a manufacturing system according to an embodiment of the present invention.

Referring now to FIG. 2, a schematic diagram illustrating a manufacturing system according to an embodiment of the present invention is shown. Group 24 includes nine industrial controllers 22a–22i. Each industrial controller includes at least one queue 50a–50k. Group 24 includes a press line, shown generally by 52, including three presses 54a–54c. Each press 54a–c receives parts from an associated loader 56a–c, respectively. Parts are unloaded from each press 54a–c by an associated unloader 58a–c, respectively. Destacker 60 provides blanks at the start of press line 52 and exit conveyor 62 delivers stamped parts from press line 52. In the embodiment shown, each piece of equipment in press line 52 is associated with one queue in an industrial controller. For example, destacker 60 is supported by queue 50a in industrial controller 22a. Likewise, loader 56b is supported by queue 50e in industrial controller 22d. In this example, some industrial controllers support a single queue, such as queue 50c in industrial controller 22c, and some industrial controllers support multiple queues, such as queues 50g and 50h in industrial controller 22f. Any number of queues may be supported by an industrial controller within the limits of that industrial controller. Queues 50*a–k* may be any convenient length that is fixed or variable in size. Code or ladder logic for initiating and maintaining queues is well known in the art of industrial controls.

Each queue 50 can hold a plurality of records, one of which is indicated by 64. Logic in each industrial controller 22 detects a predetermined event occurring in monitored equipment and stores an indication of the detected event associated with a time stamp as event record 64 in queue 50 associated with the detected event. As new events are generated, event records 64 are pushed onto queue 50. If queue 50 is full, an additional event record 64 pushed onto queue 50 will result in the oldest record 64 falling off the back end of queue 50. Traditional communication schemes require complex logic within industrial controller 22 for managing queue 50 to communicate records 64 to a central location for status monitoring. As will be described in greater detail below, the present invention dispenses with much of this complexity.

Group computer 26 communicates with industrial controllers 22*a–i* through data communication network 28. Group computer 26 establishes a scan rate for each queue 50*a–k* in group 24. Group computer 26 periodically reads event records 64 in each queue 50*a–k* based on the scan rate for that queue 50*a–k*. Group computer 26 then accumulates event records 64 for all queues 50*a–k* in group 24. Group computer 26 forwards accumulated records to server 30.

Several benefits are gained by controlling event record communication from group computer 26. First, contention and utilization of data communication network 28 is controlled by group computer 26. Thus, group computer 26 can prevent the over-utilization of network 28 for monitoring purposes, freeing network 28 for more critical tasks. Second, by placing virtually all communication overhead in group computer 26, the logic for maintaining queues 50*a–k* in industrial controllers 22*a–i* may be kept simple and uniform. Third, group computer 26 can dynamically adjust the scan rate and/or queue size for each queue 50*a*–50*k* to compensate for changing conditions within the equipment or process of press line 52, industrial controllers 22, network 28, and the like.

Referring now to FIG. 3*a*, logic for generating an event record according to an embodiment of the present invention is shown. A rung of ladder logic, such as may be found in a PLC, is shown generally by 80. Event logic, shown generally by 82, returns a logical true upon the occurrence of some condition, status, error, modification, or other event in the machine or process being monitored. The implementation of such logic is well known in the art of industrial equipment control. Event logic 82 triggers event recording logic 84, here implemented as a jump to subroutine call (JSR).

JSR 84 includes a number of parameters. Program file number 86 indicates the event queue ladder logic file for handling the event record. Codes 88, 90, 92 specify the type of event recorded and provide event parameters. A-code 88 specifies the general type of event record. For example, a value of zero in A-code 88 might indicate the record records a machinery condition. Other values for A-code 88 can be used to record changes in process recipe, plant engineering system analysis events, pre-interfaced plant engineering system analysis events, and the like. B-code 90 functions as an operational code for machinery event records. Operational codes can include indications of software error events, machine cycle events, cycle loss events, automatic dye change events for press lines, process delay events, auto cycle started events, material sensing events, process sensing events, safety sense events, and the like. C-code 92 provides an operand further elaborating or distinguishing upon B-code 90. For example, a cycle loss event may be further classified as due to a cycle-stop, E-stop, safety breach, electrical equipment failure, part mishandle, nondescript cycle loss, and the like. Similarly, process delay events may be classified as due to an end-of-line material backup condition, a no material at end-of-line condition, a front-of-line starved for material condition, a front-of-line not starved for material condition, and the like.

The ability to monitor and record recipe changes is important to monitoring and diagnosing industrial equipment problems. A recipe is the collection of variable parameters and settings known to the industrial controller and used in controlling the industrial equipment. These values may be manually or automatically changed. Any change in operating parameters may have an effect on the performance of the controlled industrial equipment. For example, a modification in cycle operation of one press may trigger a shortage of parts at an exit conveyor down the line from the press. Similarly, a change in operating parameter may decrease the occurrence of problematic events in the future. Thus, it is highly useful to provide event records recording recipe changes together with event records recording monitored equipment events.

Referring now to FIG. 3*b*, an event record generated by a monitored event according to an embodiment of the present invention is shown. Event record 64 consists of five 16-bit words. The first four bits of the first three words contain 12-bit A-code 88 (indicated by A–M). The fifth word records B-code 90 and the sixth word records C-code 92. Event record 64 also includes recipe number 100 indicating the current recipe number in place when event record 64 is generated. Recipe number 100 may be incremented each time any change to the recipe is noted by the industrial controller. Event record 64 also includes a time stamp recorded as day number 102, hour number 104 and seconds number 106. Day number 102 records the number of days since a reference date such as, for example, Jan. 1, 2000. Hour number 104 records the current hour of the current day in military notation. Seconds number 106 records the number of seconds accumulated within the current hour.

Referring now to FIG. 3*c*, an event queue according to an embodiment of the present invention is shown. Event queue 50 in the illustration shown holds twenty records 64. When new event record 64 is queued, oldest event record 64 is discarded and other event records 64 are shifted down in address space. New event record 64 is logged as at REC #19. The establishment and maintenance of such a queue is well known in the art of industrial controls. Further, while a twenty entry queue is illustrated, the present invention contemplates queues of any size. In addition, dynamically variable queue lengths are possible.

Referring now to FIG. 3*d*, an event record held in a group computer according to an embodiment of the present invention is shown. Group computer 26 scans each queue 50, based on a scan rate set for that queue, and retrieves some or all records 64 held in queue 50. Group computer 26 reformats event record 64 into group event record 110. Group event record 110 includes A-code 88, B-code 90, C-code 92 and recipe 100. Group event record 110 also includes the time stamp represented by shift code 112 and shift seconds number 114. Shift code 112 provides the plant shift number. In the embodiment illustrated, 3-bit shift code 112 can distinguish between 8 shifts. Shift seconds number 114 represents the current number of seconds since the beginning of the shift. Group event record 110 also includes queue identification number 116 which uniquely identifies the queue from which event record 110 was read. Alternatively, or in addition to storing information in the record, group event record 110 can hold information in the record file name. For example, group event record 110 can be stored in a file having a file name related to the date in which recorded events occurred.

Figure 4:
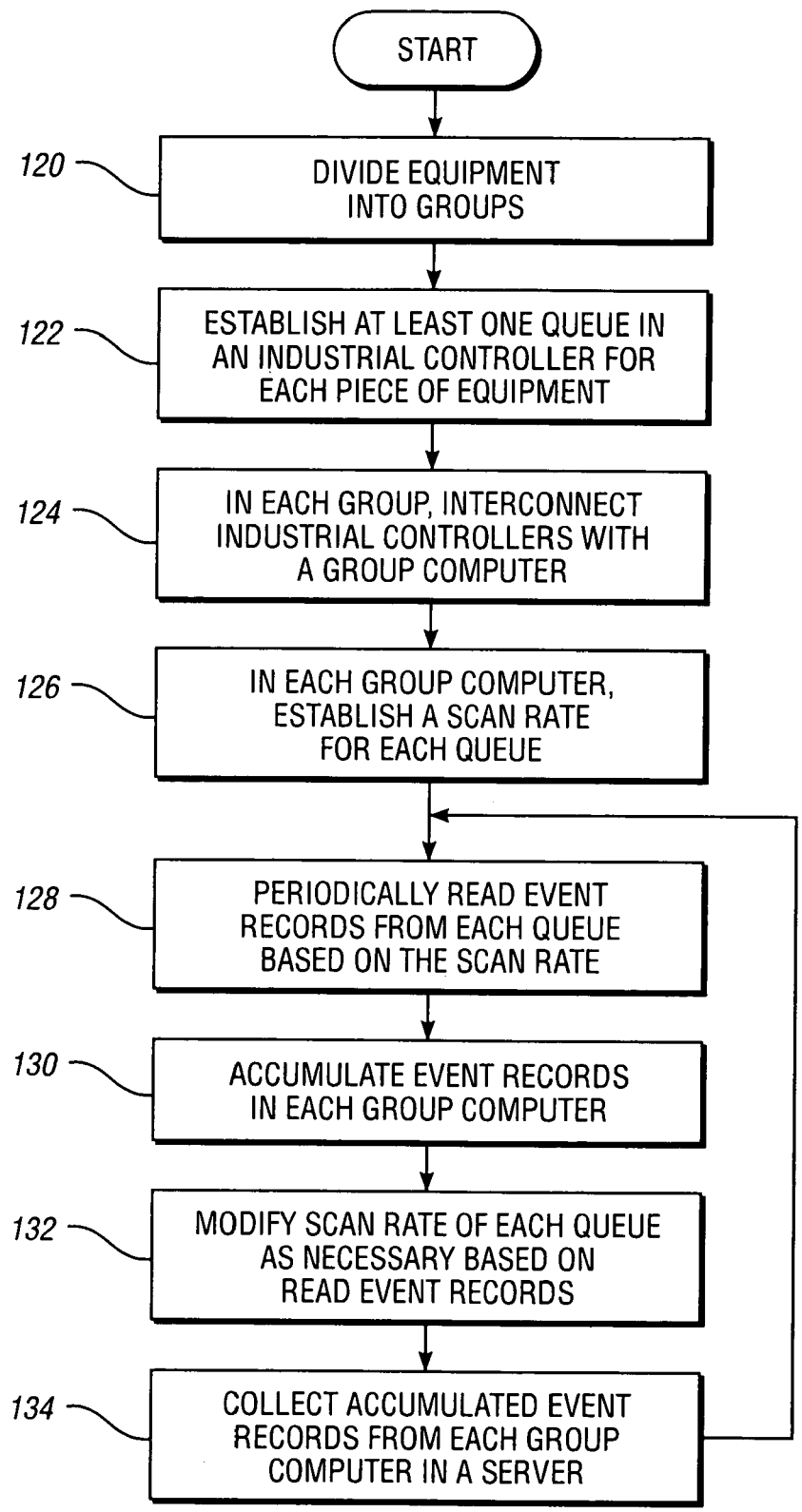
FIG. 4 is a flow diagram illustrating a method of monitoring industrial equipment according to an embodiment of the present invention.

Referring now to FIG. 4, a flow diagram illustrating a method of monitoring industrial equipment according to an embodiment of the present invention is shown. Industrial equipment is divided into groups, as in block 120. This division may be based on process or manufacturing flow such as, for example, by grouping together industrial equipment that makes up an assembly or manufacturing line. Equipment may also be grouped based on physical location such as placement within a plant or facility. Similar types of equipment may be grouped together. Grouping may also be established based on ownership, responsibility, control, and the like.

At least one queue is established in an industrial controller for each piece of equipment, as in block 122. Each industrial controller 22 defines at least one queue 50 for temporarily storing event records 64. Each queue 50 may have a fixed length or a variable length. Each machine controlled by industrial controller 22 has associated therewith at least one queue 50. Industrial controller 22 may control one or more pieces of equipment. In addition, industrial controller 22 may establish more than one queue 50 for each piece of industrial equipment controlled. Multiple queues may be used, for example, to hold event records 64 from different types of activity. This permits different scan rates by group computer 26 for retrieving each type of event records. Multiple queues for a single piece of industrial equipment may also be implemented if event records are generated more rapidly than can be retrieved by the fastest desired scan rate or to prevent loss of event records if multiple records can be generated during a time period when one queue is being accessed by the group computer. In the latter case, queues may be alternately read in successive scans by group computer 26.

The industrial controllers within a group are interconnected to a group computer, as in block 124. For each group 24, group computer 26 is connected with industrial controllers 22 through a data communication network 28. Group computer 26 accesses queues 50 in each industrial controller 22 through data communication network 28. In addition, each group computer 26 can broadcast a message over data communication network 28 to all connected industrial controllers 22 to establish a common time within the interconnected group 24. Group computer 26 may also transmit messages to each individual controller 22 to modify the effective length of queue 50.

A scan rate is established for each queue in each group, as in block 126. Group computer 26 establishes a scan rate for accessing each queue 50 within group 24. This scan rate may be initially set based on experience, simulation, preliminary operation of controlled equipment, or the like. As will be described in greater detail below, this scan rate may preferably be dynamically modified by group computer 26.

Event records are periodically read from each queue based on the scan rate, as in block 128. Group computer 26 keeps track of time elapsed since the last access of each queue 50 within group 24. When a time based on the scan rate has passed, group computer 28 accesses industrial controller 22 containing queue 50 associated with the particular scan rate and retrieves some or all records held by queue 50.

Event records are accumulated in each group computer, as in block 130. Group computer 126 receives records 64 from all queues 50 within group 24. Group computer 26 accumulates records 64, preferably in a single file. Records 64 may be arranged within this file by any convenient means, including order received, time stamp, queue identifier, and the like.

The scan rate of each queue is modified as necessary based on the event records read, as in block 132. Group computer 26 adjusts the scan rate for each queue 50 based on the rate at which event records 64 are pushed onto queue 50, the number of queues 50 supported, the desired utilization of data communication network 28, and the like. Group computer 26 may also adjust the length of each queue 64. One goal is to prevent missing records that may be pushed off the end of queue 50 between reads by group computer 26. Another goal is to minimize traffic on data communication network 28.

Accumulated event records from each group computer are collected in a server, as in block 134. Each group computer 26 forwards accumulated event records 110 to server 30 on a periodic basis. Server 30 accumulates records from each group 30 and stores these files in a format accessible by user applications. This allows server 30 to present this information in a suitable format to a variety of user devices 38 running a variety of application programs.

Figure 5:
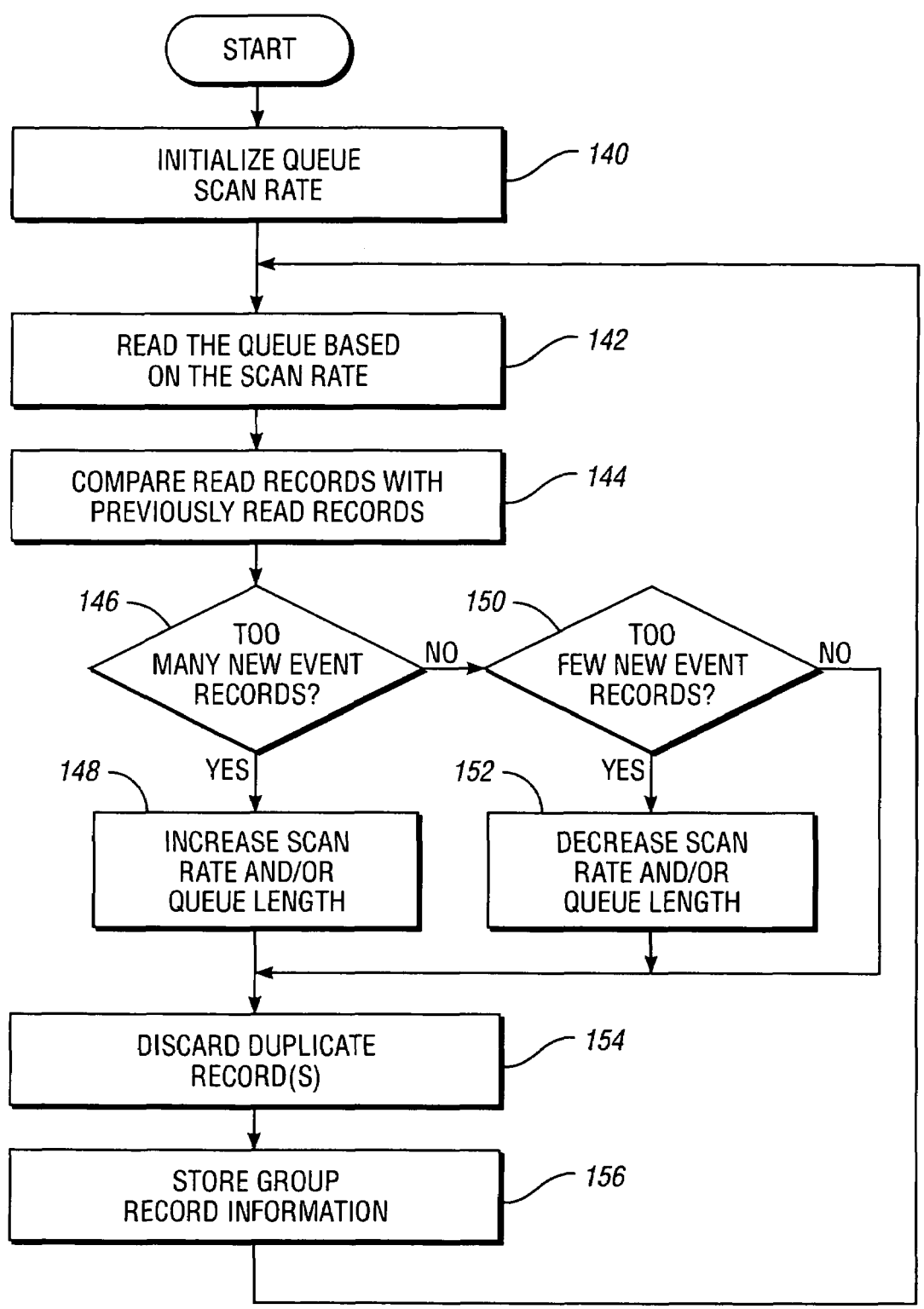
FIG. 5 is a flow diagram illustrating a method of dynamic scan rate adjustment according to an embodiment of the present invention.

Referring now to FIG. 5, a flow diagram illustrating a method of dynamic scan rate adjustment according to an embodiment of the present invention is shown. For each queue 50 a queue scan rate is initialized, as in block 140. Each group computer 26 is programmed with an initial scan rate for each queue 50 in group 24 supported by group computer 26. This scan rate may be initially set based on experience, simulation, test operation of the equipment monitored, or by any other suitable means.

During normal operation, group computer 26 reads each queue 50 based on the scan rate, as in block 142. This read operation returns all event records 64 held by queue 50. In this embodiment, group computer 26 accesses queue 50 without changing the contents of queue 50. Thus, group computer 26 accesses queue 50 without substantially changing the state of industrial controller 22 maintaining queue 50.

A comparison is made between the records just read from queue 50 and the set of records from the previous read of queue 50, as in block 144. Each record should be unique since industrial controller 22 cannot log the same event twice at the same instant in time. Therefore, a comparison of currently read records 64 and previously read records 64 will produce a number of records that remained in queue 50 between reads.

A check is made to determine if too many new records were received, as in block 146. If an excessive number of new records are counted, there has an increase in activity in queue 50 between scans. This indicates that the scan rate and/or queue length may need to be increased to prevent losing records 64 by overflow of queue 50 between scans. If necessary, the scan rate and/or queue length is then increased, as in block 148. Similarly, a check is made to determine if too few new event records were received, as in block 150. If no duplicates or a few number of duplicates are counted, there has been little change in queue 50 between scans. In this case, the scan rate may be decreased and/or the queue length shortened, as in block 152.

In addition to, or instead of adjusting the scan rate for queue 50, group computer 26 may vary the length of queue 50 by sending a message through data communication network 28 to industrial controller 22. This provides group computer 26 with the option to balance overflow probability of queue 50 with utilization of network 28, among other things.

As an alternative to, or in addition to, sending a message from group computer 26 to industrial controller 22 for varying the length of queue 50, management of queue length may be controlled within industrial controller 22. For example, a large buffer within industrial controller 22 may be set aside to implement queue 50. The effective queue length is set by controller 22 as the amount of this buffer which is actually read during each scan. If an overflow is detected, the effective length of buffer 50 can be increased automatically by controller 22.

Whether or not the scan rate is increased or decreased, a copy of the records read from queue 50 are saved for the next comparison by group computer 26. Those records which were not duplicates are held, and the remainder discarded, as in block 154, for the purpose of storing event records. Group record information is stored in group computer 26, as in block 156. Group computer 26 then waits for the scan rate timeout before repeating reading the queue, as in block 142.

Figure 6:
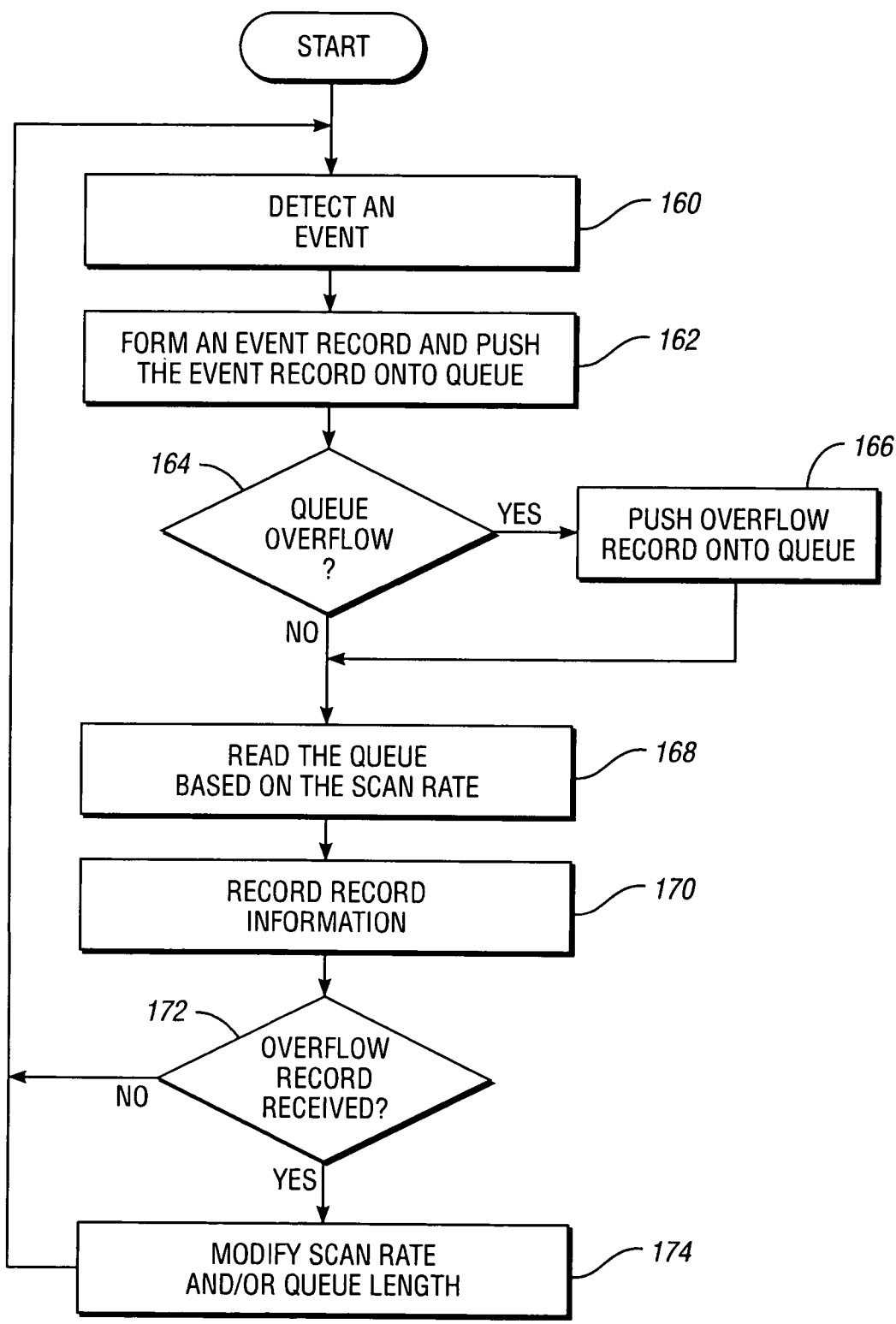
FIG. 6 is a flow diagram illustrating an alternative method of dynamic scan rate adjustment according to an embodiment of the present invention.

Referring now to FIG. 6, a flow diagram illustrating an alternative method of dynamic scan rate adjustment according to an embodiment of the present invention is shown. An event is detected, as in block 160. Industrial controller 22 detects an event, forms an event record 64 and pushes the event record onto queue 50, as in block 162. Programmable controller 22 then checks for a queue overflow, as in block 164. If a queue overflow is detected, an overflow record is pushed onto queue 50, as in block 166. With regard to block 164, a queue overflow detection need not be an actual overflow of queue 50. For example, a queue overflow record may be pushed onto queue 50 when queue 50 is detected to be half full.

Group computer 26 reads queue 50 based on the scan rate, as in block 168. In this embodiment, a read of queue 50 by group computer 26 clears all records from queue 50. The record information is recorded in group computer 26, as in block 170. A check is made to determine if an overflow record was received by group computer 26, as in block 172. If an overflow record is received, the scan rate and/or queue length is modified, as in block 174. Group computer 26 then waits a time period based on the scan rate before the next read of queue 50.

This method may be adapted to decrease the scan rate and/or queue length by tracking the number of overflow records received over time. For example, if an extended period of time has passed without receiving any overflow records, the scan rate may be decreased.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A manufacturing system comprising:
   a plurality of industrial controllers, each industrial controller executing logic establishing at least one queue having a queue length, each industrial controller implementing a time clock, each industrial controller operative detect an event, associate a preassigned event code with the event, read the time clock to obtain an event time, and store as an event record the preassigned event code associated with the event time in the queue;
   a data communication network interconnecting the plurality of industrial controllers;
   a group computer connected to the data communication network, the group computer operative to
   (a) synchronize the time clock in each of the plurality of industrial controllers to the same time at a particular instant of time,
   (b) for each queue in each industrial controller, store a queue scan rate value and the queue length,
   (c) for each queue in each industrial controller, retrieve at least one of the event records held in that queue at a periodic interval based on the scan rate value for that queue,
   (d) accumulate event records retrieved from the plurality of industrial controllers, and
   (e) periodically forward the accumulated event records; and
   a server in communication with the group computer, the server operative to receive the forwarded accumulated event records and to store the received event records for access by user interface programs.

2. The system of claim 1 wherein the group computer leaves each industrial controller in substantially the same state after retrieving event records from any queue maintained by the industrial controller.

3. The system of claim 2 wherein the group computer is further operative to remove duplicate event records retrieved from each queue.

4. The system of claim 2 wherein, for each queue, the group computer compares a set of recently retrieved event records with a set of event records retrieved from at least one preceding scan to determine if any duplicate event records were retrieved.

5. The system of claim 4 wherein the group computer dynamically adjusts the queue scan rate value based on the comparison of the set of recently retrieved event records and the set of event records retrieved from at least one preceding scan.

6. The system of claim 1 wherein the group computer dynamically adjusts the queue length based on a comparison of a set of recently retrieved event records and a set of event records retrieved from at least one preceding scan.

7. The system of claim 1 wherein each queue is emptied by the operation of retrieving all event records held in that queue, each industrial controller further operative to store a queue overflow event in the queue if the queue overflows.

8. The system of claim 1 wherein, for each queue, the group computer is operative to dynamically adjust the queue scan rate value for that queue if a queue overflow event is retrieved from that queue.

9. The system of claim 1 further comprising additional groups of industrial controllers, each additional group of industrial controllers interconnected by a data communication network to which is connected a unique group computer, each unique group computer operative to periodically forward accumulated event records to the server.

10. The system of claim 1 wherein each industrial controller is operative to store a recipe change and a time stamp for the recipe change as an event record.

11. The system of claim 1 wherein the logic establishing at least one queue is common to all industrial controllers of a similar type.

12. A method of monitoring industrial equipment divided into a plurality of groups, wherein at least one industrial controller is assigned to each group, each industrial controller monitoring conditions of at least a portion of the industrial equipment assigned to the group, the method comprising:

establishing a plurality of queues for each group, each queue operative to hold a number of event records, each queue established by logic within one of the industrial controllers;

in each industrial controller, establishing logic to detect a predetermined event and store an indication of the detected event associated with a time stamp as an event record in a queue associated with the predetermined event;

for each group, interconnecting a group computer with each of the at least one industrial controller in that group through a data communication network;

in each group computer, establishing a scan rate for each queue in that group, periodically reading the event records in each queue based on the scan rate for that queue, and accumulating the event records for all queues in that group; and collecting the accumulated event records for each group computer in a server.

13. The method of claim 12 wherein each queue is not changed when read by the group computer.

14. The method of claim 13 wherein each group computer compares a set of event records read at a first scan with another set of event records read at a previous scan, the group computer removing any duplicate records found.

15. The method of claim 13 wherein the scan rate for each queue is dynamically adjusted based on a comparison of event records read from the queue at at least two different times.

16. The method of claim 13 wherein the number of event records for each queue is dynamically adjusted based on a comparison of event records read from the queue at at least two different times.

17. The method of claim 12 wherein each queue is cleared when read by the group computer, the industrial controller further operative to store a queue overflow event in the queue if the queue overflows.

18. The method of claim 17 wherein the scan rate for each queue is dynamically adjusted based on reading at least one queue overflow event.

19. The method of claim 12 further comprising:

receiving an indication of a recipe change for at least a subset of the industrial equipment; and storing the indication of a recipe change as an event record.

20. A method of monitoring industrial equipment comprising:

detecting one of a predetermined set of events occurring in the industrial equipment;

forming an event record by associating the detected event with a time stamp;

pushing the event record onto a finite length queue initiated within an industrial controller;

reading all event records held by the queue after an interval determined as a scan rate;

discarding as a duplicate event record any event record matching a previously read event record; and dynamically determining the scan rate based on whether or not any duplicate event records are discarded.

21. A method of monitoring industrial equipment comprising:

detecting one of a predetermined set of events occurring in the industrial equipment;

forming an event record by associating the detected event with a time stamp;

pushing the event record onto a finite length queue initiated within an industrial controller;

pushing an overflow event record onto the queue if an overflow event is detected;

reading and clearing all event records held by the queue after an interval determined as a scan rate; and dynamically determining the scan rate based on reading at least one overflow event.

22. A method of monitoring industrial equipment comprising:

establishing a plurality of queues, each queue established in an industrial controller, each queue having a scan rate for that queue;

associating each of a plurality of events with an event label and one of the plurality of queues;

detecting one of the plurality of events;

storing the event label associated with the detected event together with a time stamp as an event record in the queue associated with the detected event;

reading each queue periodically at a rate determined by the scan rate for that queue; and accumulating the event records from the plurality of queues.

23. The method of claim 22 further comprising automatically adjusting the scan rate of each queue based on the event records read from that queue.

* * * * *